United States Patent [19]

Waters

[11] Patent Number: 5,262,212

[45] Date of Patent: Nov. 16, 1993

[54] HIGHLY FILLED POLYESTER COMPOSITIONS, ARTICLES, AND METHODS OF PRODUCTION

[75] Inventor: William D. Waters, Tulsa, Okla.

[73] Assignee: Fibercast Company, Sand Springs, Okla.

[21] Appl. No.: 880,745

[22] Filed: May 8, 1992

[51] Int. Cl.$^5$ .............. B29D 22/00; B32B 1/08; C08K 5/52; C08K 3/10

[52] U.S. Cl. .............. 428/35.7; 428/36.9; 524/145; 524/437; 523/506; 427/385.5

[58] Field of Search .......... 427/385.5; 428/35.8, 428/288, 290, 35.7, 36.4, 36.9; 524/145, 437, 366, 99; 523/506

[56] References Cited

U.S. PATENT DOCUMENTS

| | | | |
|---|---|---|---|
| 3,926,894 | 12/1975 | de Paul Clark | 260/29.6 |
| 4,193,908 | 3/1980 | Hsieh et al. | 260/40 R |
| 4,198,310 | 4/1980 | Lyons et al. | 252/63.2 |
| 4,373,039 | 2/1983 | Mueller et al. | 523/205 |
| 4,567,211 | 1/1986 | Oberster et al. | 521/98 |
| 4,670,494 | 6/1987 | Semenza, Jr. | 524/141 |
| 4,678,822 | 7/1987 | Lewellin | 524/12 |
| 4,722,858 | 2/1988 | Harbourne et al. | 428/220 |
| 4,806,162 | 2/1989 | Ladang | 106/18.13 |
| 4,853,424 | 8/1989 | Staendeke et al. | 523/506 |
| 4,968,556 | 11/1990 | Jain | 428/290 |
| 5,013,782 | 5/1991 | Tateno | 524/417 |
| 5,015,514 | 5/1991 | Rinehart | 428/36.4 |
| 5,104,983 | 4/1992 | Stock et al. | 524/145 |

OTHER PUBLICATIONS

A publication entitled "BYK-W995 Wetting and Dispersing Agent for Low-Shrink SMC, BMC and DMC" available from BYK-Chemie USA, 524 So. Cherry St., P.O. Box 5670, Wallingford, Connecticut 06492.

A publication entitled "Provisional Technical Data Sheet-BYK-W995" available from BYK-Chemie USA, 524 So. Cherry St., P.O. Box 5670, Wallingford, Connecticut 06492.

A Material Safety Data Sheet for BYK-W995 published by BYK-Chemie USA.

"In Fillers & Reinforcements, the Action is at the Interface," *Plastics Technology*, Jul. 1991, pp. 21–22.

A technical bulletin apparently published by BYK-Chemie USA and entitled "Technical Bulletin 101-Filler Treatment in Polyester Composites."

A sheet from a Dow Chemical publication regarding the use of 2,4-pentanedione in polyester resins.

*Primary Examiner*—Paul R. Michl
*Assistant Examiner*—Tae H. Yoon
*Attorney, Agent, or Firm*—Dougherty, Hessin, Beavers & Gilbert

[57] ABSTRACT

The present invention provides novel filament winding, hand lay-up, reaction injection molding, and pultrusion methods for producing novel articles. Each of the inventive methods utilizes a resin composition comprising a polyester base resin, a viscosity and flow improving agent, and a filler. The viscosity and flow improving agent comprises a phosphated polyester, said phosphated polyester being a saturated polyester having acidic groups. Using the inventive methods, articles having exceptionally high aluminum trihydrate loadings can be formed. These articles exhibit excellent flame resistance and smoke evolution properties.

37 Claims, No Drawings

HIGHLY FILLED POLYESTER COMPOSITIONS, ARTICLES, AND METHODS OF PRODUCTION

FIELD OF THE INVENTION

In one aspect, the present invention relates to filament winding methods and to articles produced thereby. In another aspect, the present invention relates to filament winding methods for producing fire-resistant conduits and to fire-resistant conduits produced thereby. In yet another aspect, the present invention relates to polyester base resin compositions. In yet another aspect, the present invention relates to hand lay-up methods for producing articles and to articles produced thereby. In yet another aspect, the present invention relates to reaction injection molding processes for producing articles and to articles produced thereby. In still another aspect, the present invention relates to pultrusion methods for producing articles and to articles produced thereby.

BACKGROUND OF THE INVENTION

A need presently exists for a means by which low cost, highly filled, highly flame resistant, low smoking articles can be produced by filament winding, hand lay-up, reaction injection molding, or pultrusion. A particular need presently exists for a means by which low cost, highly flame resistant, low smoking pipes, ducts, fittings, and related articles can be produced by filament winding or by hand lay-up.

Filament winding processes are commonly used to produce pipes and numerous other articles In a filament winding process, one or more continuous fiber strands are wound, under tension, around a prepared core (e.g., a pipe mandrel). Before or during the winding operation, the continuous fiber strand(s) is (are) impregnated with a thermosetting resin composition. Typically, the impregnation of the continuous fiber strand(s) is accomplished by pulling the fiber strand(s) through a resin bath prior to winding the strand(s) around the prepared core. After the impregnated fiber strand(s) has (have) been wrapped around the core, the thermosetting resin is allowed to harden (i.e., to cure). If desired, or if necessary, the filament wound product can be heated in order to accelerate the resin curing process.

Hand lay-up processes are commonly used in the art for producing pipes, pipe fittings, and numerous other articles. In a hand lay-up process, strips or sheets of fabric (e.g., a glass cloth or mat) are saturated (i.e., impregnated) with a thermosetting resin composition and are then wrapped around a prepared core (e.g., a pipe mandrel). The impregnation of the fabric strips or sheets is typically accomplished by applying the thermosetting resin composition to the fabric strips or sheets using a roller-type resin applicator. The impregnated fabric strips or sheets are wrapped around the prepared core until a desired thickness is obtained. After the impregnated fabric strips or sheets have been wrapped around the prepared core, the thermosetting resin composition is allowed to harden (i.e., to cure). If desired, or if necessary, the hand lay-up product can be heated in order to accelerate the resin curing process.

In most cases, the filament winding and hand lay-up processes used heretofore have required the use of relatively low viscosity resin compositions (i.e., compositions having viscosities of less than about 600 centipoise). The use of compositions having viscosities exceeding about 600 centipoise hinders fiber strand and fabric wetting (i.e., impregnation) and thus results in the production of filament wound products and hand lay-up products having inadequate resin content. Additionally, when used for filament winding, compositions having viscosities in the range of from about 600 to about 1000 centipoise create drag problems which result in fiber strand fraying and breakage. Similar problems are experienced when compositions having viscosities exceeding about 600 centipoise are used for pultrusion.

Due to the necessity of using low viscosity resin compositions in filament winding and hand lay-up processes, the production of fire-resistant filament wound articles and fire-resistant hand lay-up articles has heretofore been difficult and/or costly. As is known in the art, relatively inexpensive fire-resistant compression molded articles have been produced using thermosetting resin compositions which contain large amounts of aluminum trihydrate (ATH) filler. However, when an amount of ATH filler sufficient to provide desirable flame resistance properties is added to a thermosetting resin composition, the viscosity of the resin composition is increased tremendously.

In order to use a highly ATH filled thermosetting resin composition for filament winding or for hand lay-up, it has generally been necessary heretofore to substantially increase the temperature of (i.e., to heat) the resin composition during the fiber strand or fabric impregnation process. However, this approach is costly. Further, the use of a high temperature resin composition creates a substantial safety hazard for workers.

It is also noted that some filament wound articles and hand lay-up articles have been produced heretofore using non-heated, highly ATH filled epoxy resins. However, in most cases, these compositions have included certain reactive diluents which copolymerize with the epoxy resins to yield polymer products which exhibit low chemical resistance.

To produce fire-resistant articles by filament winding or hand lay-up, those skilled in the art have typically used relatively expensive halogenated thermosetting resins. Through the use of these resins, articles having excellent flame spread index values of 25 or less have been produced. Unfortunately, however, these resins give off large quantities of sooty black smoke.

BYK ®-W995 (manufactured by BYK-Chemie, 524 South Cherry Street, P. 0. Box 5670, Wallingford, Conn. 06492) has been used in low-shrink polyester compression molding compositions (i.e., sheet molding compositions, bulk molding compositions, and dense molding compositions) as a wetting and dispersing agent. A low-shrink polyester compression molding composition will typically contain at least one thermoplastic component. The thermoplastic component operates to reduce the shrinkage of, and to improve the surface quality and mechanical properties of, compression molded articles produced from the low-shrink composition. Unfortunately, it is typically difficult to incorporate substantial quantities of fillers (e.g., calcium carbonate, chopped glass fiber, ATH, and the like) in low-shrink compression molding compositions due to the disparate wetting properties of the polyester and thermoplastic components of these compositions. However, these wetting problems are reportedly alleviated by the addition of BYK ®-W995. Specifically, the addition of BYK ®-W995 to a low-shrink polyester compression molding composition increases the amount of filler which can be added to the composition at a given composition viscosity.

BYK ®-W995 is composed of about 48 parts by weight of a phosphated polyester, about 25 parts by weight of a naphtha and light aromatic solvent, about 25 parts by weight of 1-methoxy-2-propanol acetate, and up to about 2 parts by weight of phosphoric acid. The phosphated polyester component of the BYK ®-W995 composition is a saturated polyester having acidic groups. BYK ®-W995 has a boiling range (solvent) of from about 295° to about 365° F., a vapor density (air=1) of >1, a vapor pressure at 20° C. of about 4 mm Hg, a density (DIN 51757) at 20° C. in the range of from about 1.000 to about 1.050 g/cm$^3$, a flash point (Setaflash) (DIN/ISO 3679) of about 44° C., an acid value in the range of from about 46 to about 58 mg KOH/g, and a nonvolatile matter value (DIN/ISO 53216-A, 10 mins. −150° C./302° F.) in the range of from about 50 to about 54%. BYK ®-W995 is described in the publication entitled "BYK ®-W995 Wetting and Dispersing Agent for Low-Shrink SMC, BMC, and DMC," the entire disclosure of which is incorporated herein by reference. BYK ®-W995 is further described in the publication entitled "Provisional Technical Data Sheet BYK ®-W995," the entire disclosure of which is also incorporated herein by reference. Each of these publications is available from BYK-Chemie USA, 524 South Cherry Street, P.O. Box 5670, Wallingford, Conn. 06492.

SUMMARY OF THE INVENTION

The present invention provides novel filament winding, hand lay-up, reaction injection molding, and pultrusion methods for producing novel articles (e.g., pipes, ducts, similar conduits, and fittings) which (a) are highly filled, (b) have excellent flame resistance properties, and/or (c) give off very little smoke. Using the inventive filament winding method, a filament wound pipe having a flame spread index value of 0 and a smoke developed index value of only 110 has been produced. Each of the inventive methods preferably utilizes a composition which contains a large amount of aluminum trihydrate filler. The composition used in the inventive methods also contains a small amount of a viscosity and flow improving agent. The viscosity and flow improving agent is most preferably BYK ®-W995 or a substantially identical additive.

Due to the large amount of aluminum trihydrate filler and/or other filler used in the composition of the present invention, the viscosity of the composition is typically much higher than 600centipoise. However, the viscosity and flow improving agent used in the present invention unexpectedly alters the flow properties of the composition such that, even though the viscosity of the composition substantially exceeds 600 centipoise, the composition is exceptionally well suited for filament winding, for hand lay-up, and for each of the other methods of the present invention.

In one aspect, the present invention provides a method of forming a novel filament wound article. The method comprises the step of filament winding at least one continuous fiber strand which is impregnated with a resin composition. The resin composition comprises a polyester base resin, a viscosity and flow improving agent, and a filler. The viscosity and flow improving agent comprises a phosphated polyester. The phosphated polyester is a saturated polyester having acidic groups.

In another aspect, the present invention provides a method of forming a novel fire-resistant conduit comprising the steps of: (a) impregnating at least one continuous fiber strand with a resin composition, (b) winding the continuous fiber strand around a mandrel to form said conduit, and (c) removing the conduit from the mandrel. The resin composition comprises a polyester base resin, a viscosity and flow improving agent, and aluminum trihydrate. The viscosity and flow improving agent comprises a phosphated polyester in an amount of about 48 parts by weight, a naphtha and light aromatic solvent in an amount of about 25 parts by weight, and 1-methoxy-2-propanol acetate in an amount of about 25 parts by weight. The phosphated polyester is a saturated polyester having acidic groups.

The present invention further provides a method of forming a novel fire-resistant conduit comprising the steps of: (a) impregnating at least one continuous glass fiber strand with a resin composition comprising from about 25 to about 45 parts by weight of a vinyl ester resin solution, from about 55 to about 75 parts by weight of aluminum trihydrate, and from about 0.05% to about 3.0% by weight, based on the weight of the aluminum trihydrate, of a viscosity and flow improving agent; (b) then winding the continuous glass fiber strand around a mandrel to form said conduit; and (c) after the resin composition has hardened sufficiently to allow the conduit to be removed from the mandrel, removing the conduit from the mandrel. The vinyl ester resin solution used in this embodiment of the present invention comprises from about 40% to about 70% by weight vinyl ester resin. The viscosity and flow improving agent used in this embodiment consists essentially of about 48 parts by weight of a phosphated polyester, about 25 parts by weight of a naphtha and light aromatic solvent, about 25 parts by weight 1-methoxy-2-propanol acetate, and from about 0 to about 2 parts by weight phosphoric acid. The phosphated polyester component of the viscosity and flow improving agent is a saturated polyester having acidic groups.

In yet another aspect, the present invention provides a composition comprising: a polyester base resin; a viscosity and flow improving agent comprising a phosphated polyester, said phosphated polyester being a saturated polyester having acidic groups; an initiator; an accelerator; and 2,4-pentanedione. Preferably, the initiator used in this composition is benzoyl peroxide and the accelerator is preferably N,N-dimethylaniline.

The present invention further provides a method comprising the step of forming an article by hand lay-up using a fabric material impregnated with a resin composition. The resin composition comprises: a polyester base resin; a viscosity and flow improving agent; and a filler. The viscosity and flow improving agent comprises a phosphated polyester which is a saturated polyester having acidic groups.

In yet another aspect, the present invention provides a method comprising the step of forming an article by reaction injection molding. This method utilizes a composition comprising: a polyester base resin; a viscosity and flow improving agent; and a filler. The viscosity and flow improving agent comprises a phosphated polyester which is a saturated polyester having acidic groups.

Still further, the present invention provides a method comprising the step of forming an article by pultrusion. This method utilizes a composition comprising: a polyester base resin; a viscosity and flow improving agent;

and a filler. The viscosity and flow improving agent comprises a phosphated polyester which is a saturated polyester having acidic groups.

Further objects, features, and advantages of the present invention will be readily apparent to those skilled in the art upon reading the following Description of the Preferred Embodiments.

DESCRIPTION OF THE PREFERRED EMBODIMENTS

The Composition Used in the Inventive Methods

Each of the inventive methods identified above utilizes a polyester base resin-containing composition comprising: a polyester base resin; a viscosity and flow improving agent; and a filler. The filler used in this composition is preferably aluminum trihydrate (ATH). The composition also preferably includes at least one cross-linking initiator (i.e., curing agent). Further, the composition can optionally include 2,4-pentanedione, one or more promoters, one or more accelerators, one or more additional fillers, and/or other additives.

Substantially any polyester base resin can be used in the polyester base resin-containing composition. The polyester base resin can be comprised of one or more polyester base monomer materials. The polyester base resin is preferably comprised of one or more vinyl ester monomer materials. Examples of polyester base monomer materials useful in the present invention include polyester base monomer materials of the formulae:

base resin-containing composition consists essentially of the vinyl ester monomer material having Formula I.

The polyester base resin used in the polyester base resin-containing composition is also preferably a polyester base resin which has been diluted with at least one ethylenically unsaturated, polymerizable monomer to form a resin solution. Upon curing, the ethylenically unsaturated monomer(s) will typically copolymerize with the polyester base resin.

Substantially any ethylenically unsaturated polymerizable monomer commonly used for diluting polyester base resins can be used in the present invention. Examples of polymerizable monomer materials suitable for use in the present invention include: vinyl aromatic compounds such as styrene, vinyl toluene, alpha-methylstyrene, halogenated styrenes, and divinylbenzene; methyl, ethyl, isopropyl and octyl esters of acrylic and methacrylic acid; ethylene glycol diacrylate and dimethacrylate; vinyl acetate; diallyl maleate; diallyl phthalate; dicyclopentadiene acrylate; and mixtures thereof. The polymerizable monomer materials preferred for use in the present invention include: vinyl aromatic monomers such as styrene, vinyltoluene, di-, tri-, and tetrahalo styrenes, alpha-substituted styrenes and vinylnaphthalenes and hydroxyalkyl esters and alkyl esters of acrylic acid, methacrylic acid, and crotonic acid. Most preferably, the polymerizable monomer material used in the present invention is styrene.

The resin solution used in the polyester base resin-

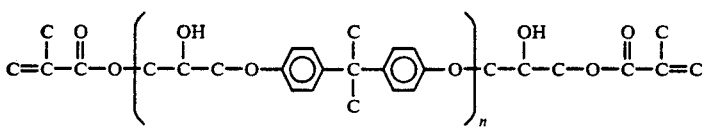

wherein n is preferably a value in the range of from about 1 to about 2

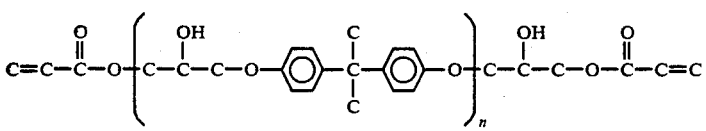

wherein n is preferably a value in the range of from about 1 to about 2

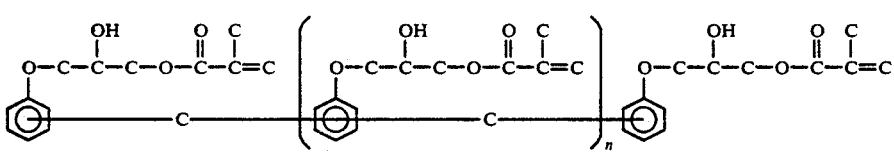

wherein n is preferably a value in the range of from about 1 to about 6

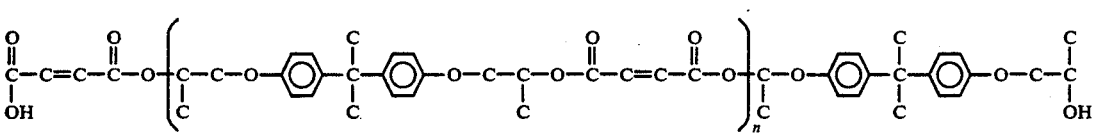

wherein n is preferably a value in the range of from about 3 to about 6

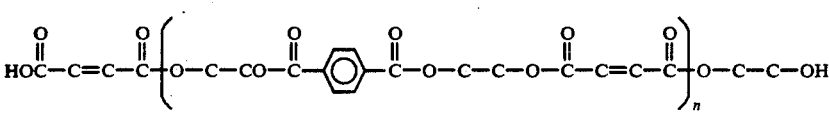

wherein n is preferably a value in the range of from about 3 to about 6

Monomers I, II, and III are vinyl ester monomers. Most preferably, the polyester base resin used in the polyester containing composition is preferably comprised of from about 30% to about 90% by weight polyester base resin and from about 10% to about 70% by weight polymerizable monomer material. When the amount of polymerizable monomer material used in the resin solution is less than about 10% by weight, the viscosity of the resin solution will generally be too high for practical use. When the amount of polymerizable monomer material used in the resin solution exceeds about 70% by weight, the amount of polyester base resin contained the resin solution will, in some instances, be too low to provide adequate physical properties. The resin solution used in the polyester base resin-containing composition is most preferably comprised of from about 40% to about 70% by weight polyester base resin and from about 30% to about 60% by weight polymerizable monomer material.

The viscosity and flow improving agent used in the polyester base resin-containing composition is comprised of a saturated, phosphated polyester having acidic groups. The viscosity and flow improving agent is preferably comprised of about 48 parts by weight of said phosphated polyester, about 25 parts by weight of a naphtha and light aromatic solvent, and about 25 parts by weight 1-methoxy-2-propanol. The viscosity and flow improving agent is most preferably BYK ®-W995 or a substantially identical additive.

The viscosity and flow improving agent operates to reduce the viscosity of the polyester base resin-containing composition and thus allows the incorporation of a large amount of ATH and/or other filler. Additionally, as mentioned above, the viscosity and flow improving agent unexpectedly alters the flow properties of the polyester base resin-containing composition such that, even though the composition has a viscosity substantially exceeding 600 centipoise, the composition is exceptionally well-suited for filament winding and for hand lay-up.

The cross-linking initiator (i.e., curing agent) used in the polyester base resin-containing composition can generally be any peroxide initiator, or other curing agent, which is commonly used for curing polyester base resins. The initiator used in the polyester base resin-containing composition is preferably a peroxide initiator. Peroxide initiators decompose to provide free radicals which promote molecular cross-linking and chain propagation. Peroxide initiators preferred for use in the polyester base resin-containing composition are benzoyl peroxide, tert-butylperbenzoate, methylethyl ketone peroxide, or combinations of two or more of these compounds.

When a peroxide initiator is used in the polyester base resin-containing composition, the composition also preferably includes one or more accelerating agents which promote the breakdown of the peroxide initiator. By promoting the breakdown of the peroxide initiator, an accelerating agent accelerates the resin curing process. The use of an accelerating agent is particularly desirable when the polyester base resin-containing composition is to be cured with little or no heating.

The accelerating agent(s) used in the polyester base resin-containing composition can generally be any accelerating agent(s) which is (are) commonly used in the art to accelerate the curing of polyester base resins. Examples of accelerating agents suitable for use in the present invention include N,N-dimethylaniline and N,N-dimethyl-p-toluidine. The amount of accelerating agent used in the polyester base resin-containing composition will generally be an amount in the range of from 0 to the amount required to obtain a desired resin curing time.

When the polyester base resin-containing composition includes a methyl ethyl ketone peroxide initiator, the composition will also preferably include an amount of a promoter, such as cobalt octoate and/or cobalt naphthenate, sufficient to cause the methyl ethyl ketone peroxide to break down at low temperature (e.g., at room temperature).

As indicated above, the polyester base resin-containing composition also preferably contains 2,4-pentanedione. 2,4-pentanedione operates to delay the gelation (i.e., curing) of the polyester base resin-containing composition. Generally, 2,4-pentanedione can be included in the polyester base resin-containing composition in an amount in the range of from 0 to an amount sufficient to ensure that the composition does not gel substantially until after the article which the composition is being used to produce has been formed.

2,4-pentanedione also operates to increase the peak curing exotherm temperature of the polyester base resin-containing composition. Thus, when the polyester base resin-containing composition must be cured with little or no heating, the addition of 2,4-pentanedione desirably causes the curing process to occur at a higher temperature and thereby promotes the achievement of a more complete cure.

A 2,4-pentanedione-containing composition which is particularly well-suited for use in the inventive methods comprises: a polyester base resin of the type described hereinabove; a viscosity and flow improving agent of the type described hereinabove; benzoyl peroxide; N,N-dimethylaniline; and 2,4-pentanedione.

In order to obtain articles having excellent fire-resistant properties, the polyester base resin-containing composition used in the present invention preferably contains a relatively large amount of aluminum trihydrate (ATH) filler. It is preferred that at least about 45% by weight of the ATH filler used in the composition have a particle size in the range of from about 10 to about 12 microns. More preferably, from about 50% to about 70% by weight of the ATH filler has a particle size in the range of from about 10 to about 12 microns and from about 50% to about 30% by weight of the ATH filler has a particle size in the range of from about 2 to about 4 microns.

The polyester base resin-containing composition used in the inventive methods can also contain other fillers (e.g., clays, talc, and/or bayerite) and/or additives which are commonly used in polyester base resin-containing compositions. In an alternative embodiment of the present invention, for example, some or all of the ATH filler used in the polyester base resin-containing composition can be replaced with clay, or some other low-cost filler. The composition can then be used in the methods of the present invention to yield highly filled, low-cost articles (e.g., general purpose, low pressure, filament wound pipes, ducts, or similar conduits).

The polyester base resin-containing composition used in each of the inventive methods preferably comprises: from about 20 to about 60 parts by weight of a polyester base resin solution as described hereinabove (preferably a vinyl ester resin solution); from about 40 to about 80 parts by weight aluminum trihydrate; and from about 0.05% to about 3.0% by weight, based on the weight of the aluminum trihydrate, of a viscosity and flow improving agent of the type described hereinabove (most preferably BYK ®-W995 or a substantially identical additive). This preferred composition possesses good filament winding and hand lay-up properties and provides articles having exceptional flame resistance and smoking properties.

The polyester base resin-containing composition used in each of the inventive methods more preferably comprises: from about 25 to about 45 parts by weight of a polyester base resin solution as described hereinabove (preferably a vinyl ester resin solution); from about 55 to about 75 parts by weight aluminum trihydrate; and from about 0.05% to about 3.0% by weight, based on the weight of the aluminum trihydrate, of a viscosity and flow improving agent of the type described hereinabove (most preferably BYK ®-W995 or a substantially identical additive). This preferred composition possesses very good filament winding and hand lay-up properties and provides articles having excellent flame resistance and smoking properties.

A polyester base resin-containing composition particularly preferred for use in the inventive methods (especially the inventive filament winding method) comprises: from about 31 to about 33 parts by weight of a vinyl ester resin solution as described hereinabove (preferably a vinyl ester resin solution wherein the vinyl ester resin consists essentially of the vinyl ester resin monomer material, identified hereinabove, having Formula I); from about 69 to about 67 parts by weight of an aluminum trihydrate (ATH) filler wherein from about 50% to about 70% by weight of said ATH filler has a particle size in the range of from about 10 to about 12 microns and from about 50% to about 30% by weight of said ATH filler has a particle size in the range of from about 2 to about 4 microns; and from about 0.05% to about 3.0% (preferably about 2.0%) by weight, based on the total weight of aluminum trihydrate used, of a viscosity and flow improving agent (e.g., BYK ®-W995 or a substantially identical additive) which consists essentially of about 48 parts by weight phosphated polyester, said phosphated polyester being a saturated polyester having acidic groups, about 25 parts by weight of a naphtha and light aromatic solvent, about 25 parts by weight 1-methoxy-2-propanol acetate, and from 0 to about 2.0 parts by weight phosphoric acid.

The Inventive Filament Winding Method

The inventive filament winding method generally comprises the steps of: (a) preparing a filament winding core, (b) preparing a polyester base resin-containing composition of the type described hereinabove, (c) impregnating one or more continuous fiber strands with the polyester base resin-containing composition (referred to in the remainder of this section as the "filament winding composition"), and then (d) wrapping the continuous fiber strand(s) around the filament winding core to form a filament wound article. After step (d), the filament winding composition is preferably allowed to cure. If desired, or if necessary, the resin curing process can be facilitated by heating the filament wound article or by generally any other means commonly used in the art for curing polyester base resins. In step (c), the continuous fiber strand(s) is (are) preferably impregnated by being pulled, under tension, through a filament winding composition bath prior to being wound on the filament winding core.

The continuous fiber strand material used in the inventive filament winding method can generally be any type of fiber strand material commonly used for filament winding. Examples of continuous fiber strand materials suitable for use in the inventive filament winding method include glass fiber strand materials, carbon fiber strand materials, aramid fiber strand materials, and boron fiber strand materials. Due to their fire-resistant properties, glass fiber strand materials are preferred for use in the inventive method.

In a particularly preferred embodiment of the present invention, the inventive filament winding method is used to produce a fire-resistant, filament wound conduit (e.g., a filament wound pipe, duct, or similar conduit). The filament winding composition used in this embodiment of the inventive filament winding method is preferably a composition, as described above, comprised of: from about 20 to about 60 parts by weight of a polyester base resin solution (preferably a vinyl ester resin solution); from about 40 to about 80 parts by weight of aluminum trihydrate; and from about 0.05% to about 3.0% by weight, based on the weight of the aluminum trihydrate filler used, of a viscosity and flow improving agent. More preferably, the filament winding composition used in this embodiment of the inventive filament winding method is a composition, as described above, comprised of: from about 25 to about 45 parts by weight of a polyester base resin solution (preferably a vinyl ester resin solution); from about 55 to about 75 parts by weight aluminum trihydrate; and from about 0.05% to about 3.0% by weight, based on the weight of aluminum trihydrate filler used, of a viscosity and flow improving agent. Most preferably, the filament winding composition used in this embodiment of the inventive filament winding method is a composition, as described above, comprising: from about 31 to about 33 parts by weight of a vinyl ester resin solution; from about 69 to about 67 parts by weight of an aluminum trihydrate filler wherein from about 50% to about 70% by weight of said filler has a particle size in the range of from about 10 to 12 microns and from about 50% to about 30% by weight of said filler has a particle size in the range of from about 2 to about 4 microns; and from about 0.05% to about 3.0% (preferably about 2.0%) by weight, based on the total weight of aluminum trihydrate filler used, of a viscosity and flow improving agent.

The composition used in the inventive filament winding method is preferably prepared by first premixing the viscosity and flow improving agent with the polyester base resin solution. The aluminum trihydrate filler, and/or any other filler used in the filament winding composition, is preferably added to the composition after this premixing step. The viscosity and flow improving agent is preferably premixed with the resin solution in this manner in order to facilitate the incorporation of a large amount of filler. If used in the filament winding composition, 2,4-pentanedione is preferably added to the composition before, during, or immediately after the addition of the aluminum trihydrate filler. As indicated above, 2,4-pentanedione desirably operates to delay the gelation of the filament winding composition so that the composition will not substantially gel until after it has been prepared and applied.

In order to further ensure that the filament winding composition does not gel prior to application, any initiators, promoters, and/or accelerators used in the filament winding composition are preferably added to the composition at the end of the composition preparation process. When used, accelerating agents will preferably be the last components added to the filament winding composition.

The components of the filament winding composition can be blended together using generally any apparatus (e.g., a low-shear mechanical mixer) commonly used in the art for preparing filament winding compositions.

When the inventive filament winding method is used to produce a filament wound pipe, duct, or similar conduit, the filament winding core used in the inventive method is preferably an elongate, rotating mandrel. To prepare the mandrel for use in the inventive filament winding method, the mandrel is preferably first wrapped with a thin cardboard sheet. This cardboard wrap is preferably covered with a mold releasing agent which will facilitate the removal of the filament wound conduit product from the rotating mandrel. The mold releasing agent can be a MYLAR sheet or generally any other type of mold releasing agent commonly used in the production of filament wound conduits.

After the rotating mandrel has been prepared in the manner just described, a coating of the filament winding composition is preferably applied to the mandrel using, for example, a roller-type resin applicator. Next, a thin filament winding veil is preferably wrapped around the mandrel. The veil used in the inventive method is preferably a glass fabric veil The veil is wrapped around the rotating mandrel until a desired veil thickness (typically about 0.020 inches) is achieved After being applied to the rotating mandrel, the veil is preferably saturated with the filament winding composition. The veil can be saturated with the filament winding composition using, for example, the roller-type resin applicator just mentioned.

Following the application and saturation of the filament winding veil, one or more continuous fiber strands are impregnated with the filament winding composition and are then wrapped around the rotating mandrel. The impregnated fiber strands are wrapped around the rotating mandrel until a desired conduit wall thickness is obtained. Although generally any conduit wall thickness can be obtained using the inventive filament winding method, the conduit produced by the inventive method will preferably have a wall thickness in the range of from about 0.1 to about 0.4 inches. The continuous fiber strand(s) used in this step of the inventive method is (are) preferably impregnated with the filament winding composition using a bath-type arrangement wherein the fiber strand(s) is (are) pulled, under tension, through the filament winding composition prior to being wound onto the rotating mandrel. The continuous fiber strand material used in this step of the inventive filament winding method is preferably a fiberglass material.

As will be understood by those skilled in the art, sufficient promoters, gel time delaying agents, initiators, and/or accelerating agents of the type described hereinabove can be incorporated in the filament winding composition such that, after the impregnated fiber strands are wrapped on the rotating mandrel, the filament winding composition will cure at ambient conditions (i.e., without the addition of heat). Alternatively, or in addition, the filament wound conduit produced in this embodiment of the inventive method can be cured by heating or by generally any other means commonly used in the art for curing polyester base resin compositions. Polyester base resin monomer materials (I)-(V) described hereinabove are preferably cured at temperatures in the range of from about 150° to about 250° F. Monomer materials (I)-(V) are most preferably cured at a temperature of about 200° F. for a period of at least about one hour.

After the filament wound conduit produced in this embodiment of the inventive method has cured sufficiently to cause the filament winding composition to harden, the filament wound conduit can be removed from the rotating mandrel.

The Inventive Hand Lay-Up Method

The inventive hand lay-up method can generally be used to produce any type of article which is commonly produced by hand lay-up. Examples include pipes, ducts, similar conduits, fume hoods, and pipe fittings. The inventive hand lay-up method generally comprises the steps of: (a) preparing a hand lay-up core, (b) preparing a polyester base resin-containing composition of the type described hereinabove, (c) impregnating sheets or strips of a fabric material with the polyester base resin-containing composition (referred to in the remainder of this section as the "hand lay-up composition"), and then (d) wrapping the impregnated fabric sheets or strips around the prepared core to form a desired article. After step (d), the hand lay-up composition is preferably allowed to cure. If desired, or if necessary, the resin curing process can be facilitated by heating the article or by generally any other means commonly used in the art for curing polyester base resins. In step (c), the fabric strips or sheets are preferably impregnated by applying the polyester base resin-containing composition thereto using a roller-type applicator.

The fabric material used in the inventive hand lay-up method can generally be any type of fabric material which is commonly used for hand lay-up. The fabric material used in the inventive hand lay-up method is preferably a glass cloth or mat.

The polyester base resin-containing composition used in the inventive hand lay-up method is preferably a highly fire resistant, highly aluminum trihydrate filled composition of the type described hereinabove which is preferred, more preferred, or particularly preferred for producing filament wound conduits. The hand lay-up composition is also preferably prepared in the same manner as the above-described filament winding composition.

When the inventive hand lay-up method is used, for example, to produce a pipe, duct, or similar conduit, the hand lay-up core used in the inventive method is preferably an elongate mandrel. The procedure described hereinabove for preparing the above-mentioned filament winding mandrel is preferably also used for preparing the hand lay-up mandrel. Specifically, the hand lay-up mandrel is preferably: wrapped with a thin cardboard sheet; then covered with a mold releasing agent; and then wrapped with a fabric veil. After the fabric veil is applied to the hand lay-up mandrel, the veil is preferably saturated with the hand lay-up composition using, for example, a roller-type resin applicator.

As will be understood by those skilled in the art, sufficient initiators, promoters, gel time delaying agents, and/or accelerating agents of the type described hereinabove can be incorporated in the hand lay-up composition such that, after an article is formed using the inventive hand lay-up method, the hand lay-up composition will cure at ambient conditions (i.e., without the addition of heat). Alternatively, or in addition, the hand lay-up composition can be cured by heating or by generally any other means commonly used in the art for curing polyester base resin compositions.

Other Inventive Methods

As indicated above, the above-described polyester base resin-containing composition can also be used to produce articles by reaction injection molding and by pultrusion. Generally any reaction injection molding or pultrusion procedures commonly used in the art for forming articles from thermosetting polymer resin compositions can be used in the present invention. The polyester base resin-containing composition used in the present invention for reaction injection molding or pultrusion is preferably a highly fire resistant, highly aluminum trihydrate filled composition of the type described hereinabove which is preferred, more preferred, or particularly preferred for producing filament wound conduits.

The polyester base resin-containing composition used in the inventive pultrusion method is preferably prepared in the same manner as the above-described filament winding composition.

In the inventive reaction injection molding method, an injection mold is preferably first filled with aluminum trihydrate filler, glass fiber, and/or other filler desired for use in the polyester base resin-containing composition. Next, an initiator and a composition comprising all of the other components of the polyester base resin-containing composition are simultaneously injected into the injection mold. The initiator and the composition containing all of the other components of the polyester base resin-containing composition are injected under sufficient pressure to cause thorough mixing to occur within the mold.

In the inventive pultrusion method, a continuous fiber material (e.g., one or more continuous fiber strands) impregnated with the polyester base resin-containing composition is preferably pulled through a forming die to produce a pultruded article (e.g., a pultruded tape, rod, sheet, or structural member). If desired, or if necessary, the impregnated fiber material can be heated before and/or while being pulled through the forming die. The impregnated, shaped material exiting the forming die can be cut to a desired length and cured. Alternatively, the inventive pultrusion process can be used to produce noncured prepreg materials. These prepreg materials can in turn be used to produce other articles such as compression molded laminates.

The continuous fiber material used in the inventive pultrusion method can generally be any continuous fiber material commonly used for pultrusion (e.g., a continuous glass fiber material, a continuous carbon fiber material, or a continuous aramid fiber material). The continuous fiber material used in the inventive pultrusion method is preferably a continuous glass fiber material. The continuous fiber material is preferably impregnated with the polyester base resin-containing composition using a bath arrangement wherein the continuous fiber material is pulled through the composition, under tension, prior to being pulled through the forming die.

The following examples are presented in order to further illustrate the present invention.

EXAMPLE 1

A filament winding composition containing 40 parts by weight (pbw) of a vinyl ester resin solution and 60 pbw of an aluminum trihydrate (ATH) filler was prepared in a 5-gallon container. The vinyl ester resin solution was composed of 50 pbw of the vinyl ester resin monomer material identified hereinabove having Formula I diluted with 50 pbw styrene. The ATH filler had a particle size in the range of from about 10 to about 12 microns. The filament winding composition also contained: 1.2 pbw BYK ®-W995; 0.6 pbw phlegmatized benzoyl peroxide; 0.08 pbw tert-butylperbenzoate; 0.02 pbw N,N-dimethylaniline; and 0.2 pbw 2,4-pentanedione. The filament winding composition had a viscosity of about 2,300 centipoise at room temperature.

The components of the filament winding composition were blended together in the 5-gallon container using a mechanical mixer. The composition was formed by first mixing the BYK ®-W995 additive with the vinyl ester resin solution. Next, the ATH filler was added to the 5-gallon container and the contents of the container were mixed for about 15 minutes. The remaining components of the filament winding composition were then added, with thorough mixing, in the following order: (1) 2,4-pentanedione; (2) benzoyl peroxide; (3) tert-butylperbenzoate; and (4) N,N-dimethylaniline.

The filament winding composition was used, at room temperature, to form a 3-inch I.D. filament wound pipe. The filament wound pipe was prepared by first wrapping a MYLAR sheet around a rotating mandrel. Next, a coat of the filament winding composition was applied to the MYLAR wrap using a roller-type resin applicator. A glass fabric veil was then wrapped around the rotating mandrel to a thickness of about 0.02 inches The glass veil was saturated with the filament winding composition by applying the filament winding composition thereto using the roller-type applicator. Next, glass fiber strands impregnated with the filament winding composition were wrapped around the rotating mandrel until a pipe wall thickness of about 0.40 inches was obtained. The glass fiber strands were impregnated with the filament winding composition, at room temperature, by placing the composition in a bath container and then pulling the glass fiber strands through the container.

Unexpectedly, the filament winding composition was very well suited for filament winding even though the viscosity of the composition greatly exceeded 600 centipoise. Specifically, the addition of BYK ®-W995 to the filament winding composition unexpectedly altered the flow properties of the composition such that a thorough fiber wetout was achieved and no fiber strand fraying or breakage occurred. Without the addition of BYK ®-W995, the filament winding composition would have been a pasty material totally unsuitable for filament winding.

The filament wound pipe produced in this example was cured at a temperature of about 250° F. for a period of about one hour by passing steam through the center of the rotating mandrel.

After curing, the filament wound pipe was removed from the mandrel and then tested pursuant to ASTM E84-91a, "Standard Method of Test for Surface Burning Characteristics of Building Materials." The results of these tests are provided in Table I.

EXAMPLE II

A second filament winding composition was prepared using the same procedure set forth in Example I. The second filament winding composition was composed of: 32 pbw of the same vinyl ester resin lo solution used in Example I; 40.8 pbw of an ATH filler having a particle size in the range of from about 10 to about 12 microns; 27.2 parts by weight of an ATH filler having a particle size in the range of from about 2 to about 4 microns; 1.5 pbw BYK ®-W995; 0.2 pbw 2,4-pentanedione; 0.6 pbw phlegmatized benzoyl peroxide; 0.08 pbw tert-butylperbenzoate; and 0.01 pbw N,N-dimethylaniline. This second filament winding composition had a viscosity of 2,300 centipoise at room temperature.

Using the same procedure set forth in Example I, the second filament winding composition was used to form a 3-inch I.D. filament wound pipe having a wall thickness of about 0.336 inches. Although the viscosity of the second filament winding composition substantially exceeded 600 centipoise, the second composition was also very well suited for filament winding. Without the addition of BYK ®-W995, the second filament winding composition would also have been a pasty material totally unsuitable for filament winding.

The filament wound pipe produced using the second filament winding composition was tested in the same manner as the filament wound pipe produced in Example I. The results of these tests are provided in Table I.

TABLE I

Compositions and Test Results

| | Example I | Example II |
|---|---|---|
| Filament Winding Composition Components (pbw) | | |
| Vinyl Ester Resin Solution | 40 | 32 |
| ATH Filler (10-12 Micron Particle Size) | 60 | 40.8 |
| ATH Filler (2-4 Micron Particle Size) | — | 27.2 |
| BYK ®-W995 | 1.2 | 1.5 |
| 2,4-Pentanedione | 0.2 | 0.2 |
| Phlegmatized Benzoyl Peroxide | 0.6 | 0.6 |
| Tert-Butylperbenzoate | 0.08 | 0.08 |
| N,N-Dimethylaniline | 0.02 | 0.01 |
| Test Results | | |
| Flame Spread Index[1] | 10 | 0 |
| Smoke Developed Index[1] | 370 | 110 |

[1]ASTM E84-91a, "Standard Method of Test for Surface Burning Characteristics of Buildings Materials."

The test results provided in Table I indicate that the filament winding compositions of Examples I and II provided filament wound pipe having excellent flame resistance and smoking properties. As will be understood by those skilled in the art, a composition having a flame spread index value of 25 or less and a smoke developed index value of 450 or less is highly flame-resistant and gives off very little smoke. Due to the exceptionally high ATH filler loading obtained in the filament winding composition of Example I, the filament wound pipe produced in Example I exhibited a flame spread index value of only 10 and a smoke developed index value of only 370. Due to the even greater ATH filler loading obtained in the filament winding composition of Example II, the filament wound pipe produced in Example II exhibited a flame spread index value of 0 and a smoke developed index value of only 110.

EXAMPLE III

A hand lay-up composition containing 40 pbw of the same vinyl ester resin solution used in Example I and 60 pbw of the same ATH filler used in Example I was prepared in a 5-gallon container. The hand lay-up composition also contained: 1.2 pbw BYK ®-W995; 2 pbw methyl ethyl ketone peroxide; 0.25 pbw of a 12% by weight cobalt octoate solution; and 0.8 pbw N,N-dimethyl-p-toluidene. The hand lay-up composition had a viscosity of about 1,600 centipoise at room temperature.

The components of the hand lay-up composition were blended together in the 5-gallon container using a mechanical mixer. The composition was formed by first mixing the BYK ®-W995 additive with the vinyl ester resin solution. Next, the ATH filler was added to the 5-gallon container and the contents of the container were mixed for about 15 minutes. The remaining components of the hand lay-up composition were then added, with thorough mixing, in the following order: (1) methyl ethyl ketone peroxide; (2) cobalt octoate; and (3) N,N-dimethyl-p-toluidene.

The hand lay-up composition was then, at room temperature, used to form a 3 inch I.D. elbow. The elbow was prepared by first spraying a mold releasing agent on a 3 inch elbow mold. Next, a glass fabric veil saturated with the hand lay-up composition was wrapped around the mold to a thickness of about 0.02 inches. The glass veil was saturated with the hand lay-up composition by applying the composition thereto using a roller-type applicator. Next, 16 inch wide strips of glass fabric were impregnated with the hand lay-up composition using the roller-type applicator. The impregnated fabric strips were then wrapped around the mold until a wall thickness of about 0.3 inches was obtained.

The elbow produced in this example was cured at a temperature of about 200° F. for a period of about one hour.

Unexpectedly, the polyester base resin-containing composition used in this example was very well suited for hand lay-up even though the viscosity of the composition greatly exceeded 600 centipoise. Specifically, the addition of BYK ®-W995 to the hand lay-up composition altered the flow properties of the composition such that the composition was easily applied to the glass fabric and excellent fabric wetout was achieved. Without the addition of BYK ®-W995, the hand lay-up composition would have been a pasty material totally unsuitable for hand lay-up.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of forming an article comprising the step of:
   (a) wrapping a filament winding veil around a filament winding core;
   (b) saturating said filament winding veil with a resin composition comprising a polyester base resin, a viscosity and flow improving agent, and a filler, said viscosity and flow improving agent comprising a saturated, phosphated polyester; and
   (c) filament winding at least one continuous fiber strand impregnated with said resin composition around said filament winding veil prepared in accordance with steps (a) and (b).

2. A method as described in claim 1 wherein said filler is aluminum trihydrate.

3. A method as described in claim 2 wherein said polyester base resin is a vinyl ester resin.

4. A method as described in claim 2 wherein:

said polyester base resin is present in said resin composition in the form of a polyester base resin solution, said polyester base resin being present in said solution in an amount in the range of from about 30% to about 90% by weight of said solution;

said polyester base resin solution is present in said resin composition in an amount in the range of from about 20 parts by weight to about 60 parts by weight; and said aluminum trihydrate is present in said resin composition in an amount in the range of from about 80 to about 40 parts by weight.

5. A method as described in claim 4 wherein:

said viscosity and flow improving agent is present in said resin composition in an amount in the range of from about 0.05% to about 3.0% by weight based on the weight of said aluminum trihydrate.

6. A method as described in claim 5 wherein:

said polyester base resin solution is present in said resin composition in an amount in the range of from about 25 to about 45 parts by weight and said aluminum trihydrate is present in said resin composition in an amount in the range of from about 55 to about 75 parts by weight.

7. A method as described in claim 1 wherein said resin composition further comprises: an initiator; an accelerator; and 2,4-pentanedione.

8. A method as described in claim 7 wherein said initiator is benzoyl peroxide and said accelerator is N,N-dimethylaniline.

9. A method as described in claim 1 further comprising the step of at least partially curing said resin composition.

10. An article formed by the method of claim 1.
11. An article formed by the method of claim 2.
12. An article formed by the method of claim 4.
13. An article formed by the method of claim 5.
14. An article formed by the method of claim 6.
15. An article formed by the method of claim 7.
16. An article formed by the method of claim 9.

17. A method of forming a fire-resistant conduit comprising the steps of:

(a) impregnating at least one continuous fiber strand with a resin composition comprising a polyester base resin, a viscosity and flow improving agent, and aluminum trihydrate, said viscosity and flow improving agent comprising a saturated, phosphated polyester in an amount of about 48 parts by weight, a naphtha and light aromatic solvent in an amount of about 25 parts by eight, and 1-methoxy-2-propanol acetate in an amount of about 25 parts by weight;

(b) winding said continuous fiber strand around a filament winding veil to form said conduit;

(c) removing said conduit from said filament winding core;

(d) prior to step (b), wrapping a filament winding veil around said filament winding core; and (e) prior to step (b), saturating said filament winding veil with said resin composition.

18. A method as described in claim 16 wherein said polyester base resin is a vinyl ester resin.

19. A method as described in claim 17 wherein:

said polyester base resin is present in said resin composition in the form of a polyester base resin solution, said polyester base resin being present in said solution in an amount in the range of from about 30% to about 90% by weight of said solution;

said polyester base resin solution is present in said resin composition in an amount in the range of from about 20 to about 60 parts by weight;

said aluminum trihydrate is present in said resin composition in an amount in the range of from about 80 to about 40 parts by weight; and said viscosity and flow improving agent is present in said resin composition in an amount in the range of from about 0.05% to about 3.0% by weight based on the weight of said aluminum trihydrate.

20. A method as described in claim 19 wherein:

said polyester base resin solution is present in said resin composition in an amount in the range of from about 25 to about 45 parts by weight and said aluminum trihydrate is present in said resin composition in an amount in the range of from about 55 to about 75 parts by weight.

21. A method as described in claim 17 wherein said resin composition further comprises: benzoyl peroxide; N,N-dimethylaniline; and 2,4-pentanedione.

22. A method as described in claim 17 wherein said method further comprises the step, after step (b) and prior to step (c), of at least partially curing said thermosetting resin.

23. A fire-resistant conduit formed by the method of claim 17.

24. A fire-resistant conduit formed by the method of claim 19.

25. A fire-resistant conduit formed by the method of claim 20.

26. A fire-resistant conduit formed by the method of claim 21.

27. A fire-resistant conduit formed by the method of claim 22.

28. A method of forming a fire-resistant conduit comprising the steps of:

(a) impregnating at lest one continuous glass fiber strand with a resin composition comprising: from about 25 to about 45 parts by weight of a vinyl ester resin solution, said vinyl ester resin solution comprising from about 40% to about 70% by weight of a vinyl ester resin based on the total weight of said vinyl ester resin solution; from about 75 to about 55 parts by weight of aluminum trihydrate; and from about 0.05% to about 3.0% by eight, based on the weight of said aluminum trihydrate, of a viscosity and flow improving agent, said viscosity and flow improving agent consisting essentially of about 48 parts by weight of a saturated, phosphated polyester, about 25 parts by weight of a naphtha and light aromatic solvent, about 25 parts by weight 1-methoxy-2-propanol acetate, and from 0 to about 2 parts by weight phosphoric acid;

(b) then winding said continuous glass fiber strand around a filament winding veil to form said conduit;

(c) after said resin composition has hardened sufficiently to allow said conduit to be removed from said core, removing said conduit from said core;

(d) prior to step (b), wrapping a filament winding veil around said filament winding core; and (e) prior to step (b), saturating said filament winding veil with said resin composition.

29. A method as described in claim 28 wherein from about 30% to about 50% by weight of said aluminum trihydrate has a particle size in the range of from about 2 to about 4 microns and from about 70% to about 50% by weight of said aluminum trihydrate has a particle size in the range of from about 10 to about 12 microns.

30. A method as described in claim 29 wherein said aluminum trihydrate is present in said resin composition in an amount in the range of from about 67 to about 69 parts by weight and said vinyl ester resin solution is present in said resin composition in an amount in the range of from 33 to about 31 parts by weight.

31. A method as described in claim 28 wherein said resin composition is prepared by a method comprising the steps of:
 (i) mixing said viscosity and flow improving agent with said vinyl ester resin solution and then
 (ii) mixing said aluminum trihydrate with the mixture formed in step (i).

32. A method as described in claim 28 further comprising the step, after step (b) and prior to step (c), of at least partially curing said resin composition.

33. A fire-resistant conduit formed by the method of claim 28.

34. A fire-resistant conduit formed by the method of claim 29.

35. A fire-resistant conduit formed by the method of claim 30.

36. A fire-resistant conduit formed by the method of claim 31.

37. A fire-resistant conduit formed by the method of claim 32.

* * * * *